US009358595B2

(12) United States Patent
Dauphinais

(10) Patent No.: US 9,358,595 B2
(45) Date of Patent: Jun. 7, 2016

(54) ROLLING STAND ROLL NECK SEAL

(75) Inventor: Raymond P. Dauphinais, Marlborough, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 297 days.

(21) Appl. No.: 13/602,590

(22) Filed: Sep. 4, 2012

(65) Prior Publication Data
US 2013/0075973 A1    Mar. 28, 2013

Related U.S. Application Data

(60) Provisional application No. 61/540,017, filed on Sep. 28, 2011.

(51) Int. Cl.
| | |
|---|---|
| *B21B 1/18* | (2006.01) |
| *F16J 15/46* | (2006.01) |
| *B21B 31/07* | (2006.01) |
| *F16J 15/34* | (2006.01) |
| *B21B 13/00* | (2006.01) |

(52) U.S. Cl.
CPC ............ *B21B 31/078* (2013.01); *F16J 15/3448* (2013.01); *F16J 15/46* (2013.01); *B21B 1/18* (2013.01); *B21B 13/005* (2013.01)

(58) Field of Classification Search
CPC ...... B21B 31/078; B21B 1/18; B21B 13/005; F16J 15/3448; F16J 15/46
USPC .................... 72/199, 237–249; 277/306, 387
See application file for complete search history.

(56) References Cited

U.S. PATENT DOCUMENTS

| | | | | |
|---|---|---|---|---|
| 4,103,903 | A | * | 8/1978 | Capriotti ................. F16J 15/46 277/387 |
| 5,577,405 | A | | 11/1996 | Shore |
| 5,855,134 | A | * | 1/1999 | Womelsdorf ......... B21B 31/078 72/200 |
| 6,134,930 | A | | 10/2000 | Puchovsky |

FOREIGN PATENT DOCUMENTS

| | | | |
|---|---|---|---|
| CN | 102119062 A | 7/2011 | |
| DE | 19654062 A1 | 6/1998 | |
| GB | 2106196 A * | 4/1983 | ............ B21B 31/078 |
| RU | 2147948 C1 * | 4/2000 | ............ B21B 31/078 |

OTHER PUBLICATIONS

Espacenet Translation of RU 2147948 C1.*
PCT International Search Report mailed Feb. 11, 2013 corresponding to PCT International Application No. PCT/US2012/053816 filed Sep. 6, 2012 (11 pages).
Chinese Office Action Issued in Corresponding Patent Application No. 201280047798.4 Mailed on Feb. 11, 2015.

* cited by examiner

*Primary Examiner* — Shelley Self
*Assistant Examiner* — Peter Iannuzzi
(74) *Attorney, Agent, or Firm* — Gesmer Updegrove LLP

(57) ABSTRACT

A rolling mill roll neck is sealed by interposing a seal between a roll flinger having a first axial surface and an opposing second axial surface of a roll housing retaining plate. The seal is biased into contact against one of the axial surfaces with a pressurized fluid source, such as compressed air. As the seal wears during roll neck operation the pressurized fluid maintains biasing contact between the seal and the axial surface. The remainder of the intact seal is remains pressed into contact with the mating, opposing axial surface, for example that of a roll flinger or a retaining plate. Advantageously the seal is housed in a stationary retaining plate that is in opposed axial relationship with a rotating flinger.

2 Claims, 5 Drawing Sheets

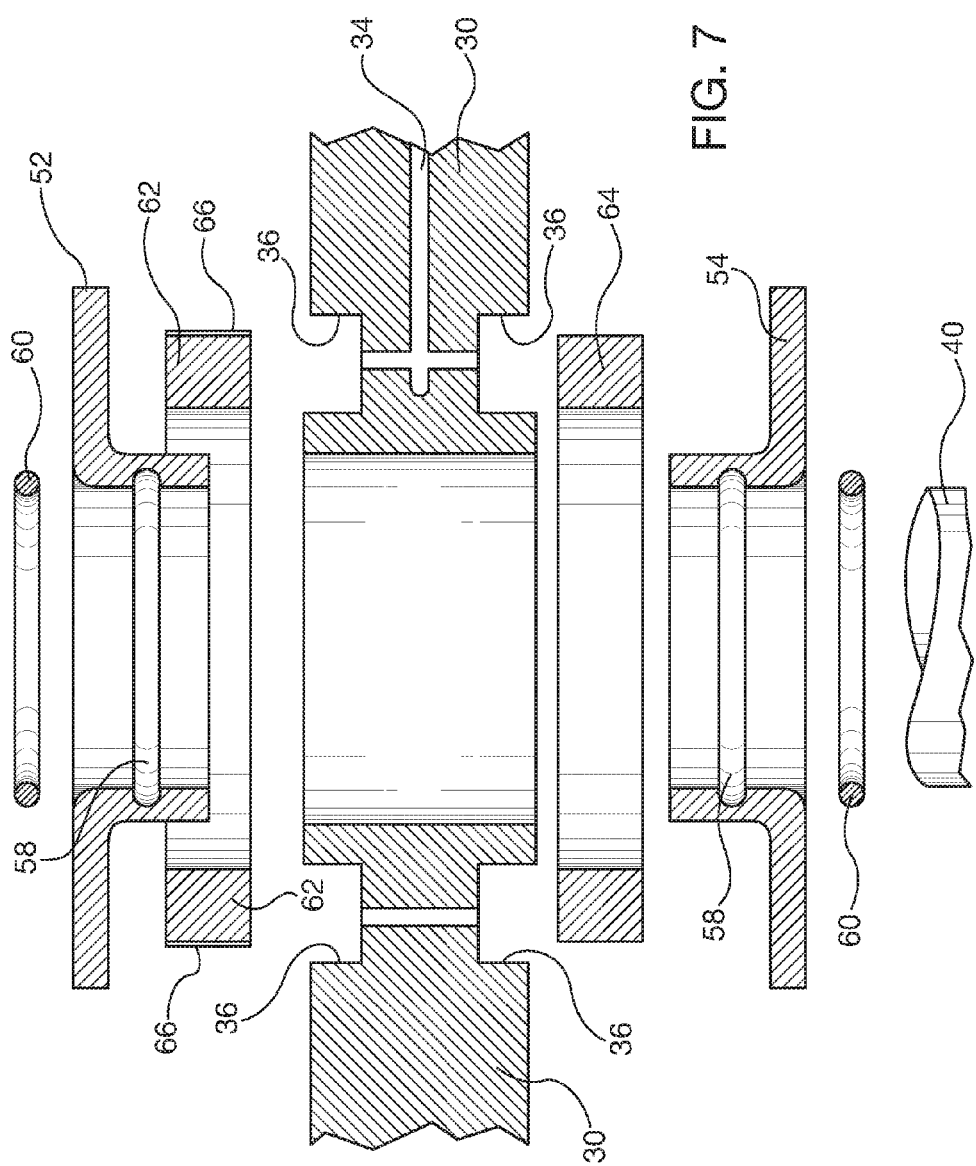

ROLLING STAND ROLL NECK SEAL

CROSS-REFERENCE TO RELATED APPLICATIONS

This application claims the benefit of U.S. provisional patent application entitled "Roll Neck Seal" filed Sep. 28, 2011 and assigned Ser. No. 61/540,017, which is incorporated by reference herein.

BACKGROUND

1. Field of the Invention

Embodiments of the present invention relate generally to a sealing device, and more particularly to a rolling stand roll neck seal for metal rolling mills, including steel mills.

2. Description of the Prior Art

As described and shown in U.S. Pat. Nos. 5,557,405 and 6,134,930, the contents of each which are incorporated by reference herein, a single stand block-type rolling mill has pairs of oppositely inclined work rolls arranged successively along a mill pass line to roll rod and bar products in a twist-free manner. Each roll stand is lubricated internally with oil and is often cooled externally with coolant water. A roll neck seal is commonly used in a rolling stand to prevent water entering and oil exiting the mill roll housing, particularly when a roll shaft is expected to deflect under load while pinching or compressing the rolled product.

Known conventional roll neck seal apparatuses are shown in FIG. 3 of U.S. Pat. No. 6,134,930. An annular, generally C-shaped cross section elastomeric seal ring 56 is restrained in the axial direction within a pair of oil flingers. The seal ring and flingers circumscribe the roll 40 and are retained in the stand housing by a retainer or seal plate 54. The retainer plate 54 inner periphery circumscribing the roll shaft 40 is retained within the C-shaped cross section of the seal ring 56. As noted in the aforementioned '390 patent, commonly, after seal rings wear, they need replacement. Seal ring replacement requires disassembly of the retailer seal plate and seal ring components. It is desirable to extend roll neck seal to reduce sealing ring replacement frequency. It is also desirable to maintain desired sealing effectiveness during seal service life.

SUMMARY

The roll neck seal apparatus of the present invention compensates for seal wear by introducing pressurized fluid, such as air behind the seal, so that the seal remains in contact with its opposing axial surface during operation of the rolling mill. As the seal wears axially the remainder of the intact seal is pressed into contact with the mating, opposing axial surface, for example a roll flinger or a retaining plate. Advantageously the seal is housed in a stationary retaining plate that is in opposed axial relationship with a rotating flinger.

Embodiments of the present invention feature a rolling mill roll neck sealing apparatus, which includes a roll having a circumference and axial length. A first axial retaining element circumscribes the roll and has a first axial surface. A seal circumscribes the roll, and has a first axial seal face in contact with the first axial surface. The seal also has a second axial face. A cavity is in communication with the seal, which is in turn in communication with a pressurized fluid source that biases the seal first axial face into contact with said first axial surface.

Embodiments of the present invention also feature a rolling mill roll neck sealing apparatus, including a roll having a circumference and axial length. A first flinger circumscribes the roll and has a first axial surface. A retaining plate also circumscribes the roll and has a second axial surface in opposed, spaced relationship with the finger's first axial surface. A first seal circumscribes the roll and is interposed between the first and second axial surfaces. That seal has a first axial seal face in contact with one of the axial surfaces and a second axial face. A first cavity is defined between the first seal second axial face and the other one of said axial surfaces, for communication with a pressurized fluid source that biases said first seal first axial face into contact with said one of the axial surfaces.

Other embodiments of the present invention feature a method for sealing a rolling mill roll neck by interposing a first seal between a roll first flinger having a first axial surface and a retaining plate having a second axial surface in opposed spaced relationship with the first axial surface. The first seal is biased against one of the axial surfaces with a pressurized fluid source.

The objects features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIG. 7 is an exploded assembly view of an embodiment of a roll neck seal of the present invention.

To facilitate understanding, identical reference numerals have been used, where possible, to designate identical elements that are common to the figures.

DETAILED DESCRIPTION

To facilitate an understanding of embodiments, principles, and features of the present invention, they are explained hereinafter with reference to implementation in illustrative embodiments. In particular, they are described in the context of being a roll neck seal apparatus for rolling mill stands and related systems. Embodiments of the present invention, however, are not limited to use in the described systems.

In an exemplary embodiment, by using pressurized fluid media, such as compressed air, two seal rings can be biased into the inside of flinger walls to seal in both axial directions. The air pressure can remain constant and can act like a spring when any deflection in the roll end causes the flingers to move relative to the seal retaining plate, such as a figure eight plate that is utilized to retain seals in a pair of single strand product mill stand rollers. As the seal apparatus assembly rotates, wear can (and likely will) occur on the seal rings, but because they are of a certain length and under pressure, they will be fed out over a longer period of time compared to known, non-pressurized rolling neck seals. As a result of aspects of the present invention, the life of the seal can increase and will thus be much greater than a normal sealing arrangement, because it continually replenishes itself. Thus the sealing reliability and service life of seal apparatus of the present invention are increased compared to conventional, non-pressurized seals. The seal can be constructed with axial passages or external axial face surfaces flutes to allow air to purge external the seal toward the flingers. The positive pressure from inside the seal apparatus escaping to the flinger and stand housing can also aid in keeping coolant water from entering the seal area.

Figure 1:
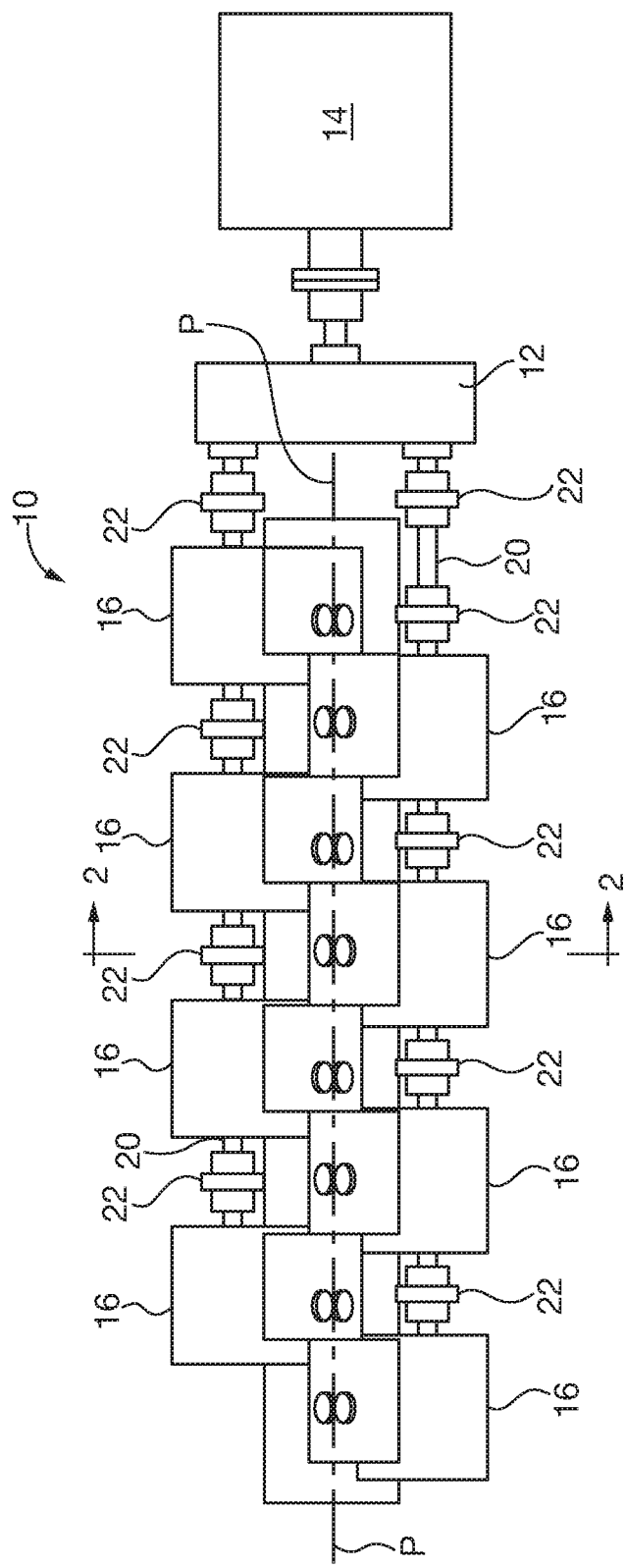
FIG. 1 shows a schematic plan view of a rolling mill line including a plurality of single strand metal rod finishing stands including pairs of opposed necked rolls, that respectively include embodiments of the roll neck seals of the present invention.
Figure 2:
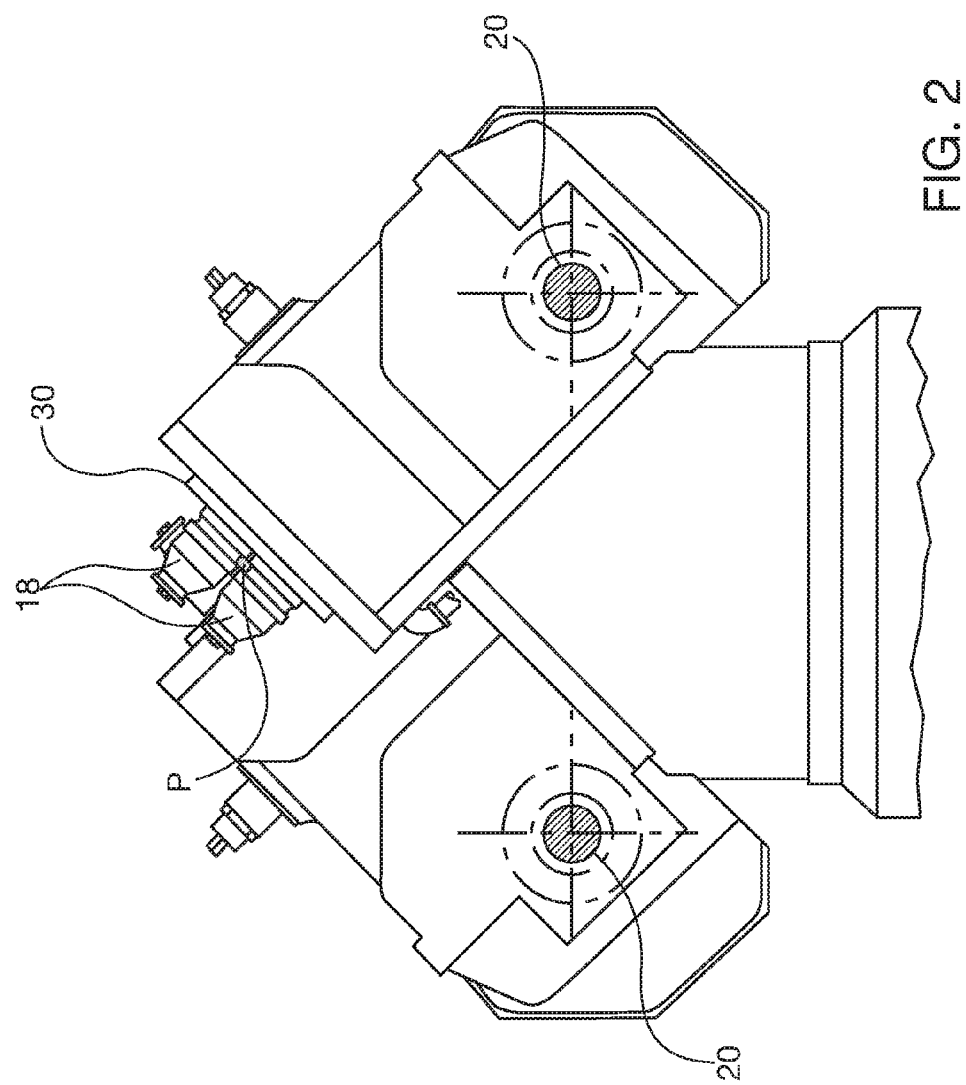
FIG. 2 shows an elevational view of a metal rod finishing stand of FIG. 1, that includes embodiments of the roll neck seals of the present invention.

FIGS. 1 and 2 shows rolling mill finishing block or line 10 for rolling single strand metal product P, having a general structure and operation as shown and described in the aforementioned U.S. Pat. No. 6,134,930. The finishing block 10 is powered by a speed increaser 12 and drive motor 14. The roll stands 16 have cantilevered pairs of work rolls 18 alternatively offset and staggered at 90 degrees relative to each other. The roll stands 16 are coupled to the speed increaser 12 by line shaft segments 20 and couplings 22.

Figure 4:
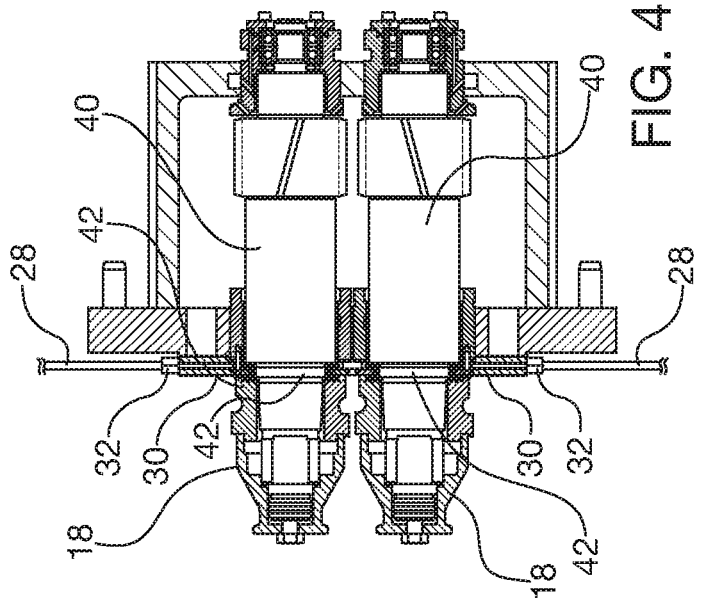
FIG. 4 shows an elevational cross sectional view of an upper portion of a roll stand of a high speed rod finishing block that includes embodiments of the roll neck seals of the present invention, taken along 4-4 of FIG. 3.
Figure 3:
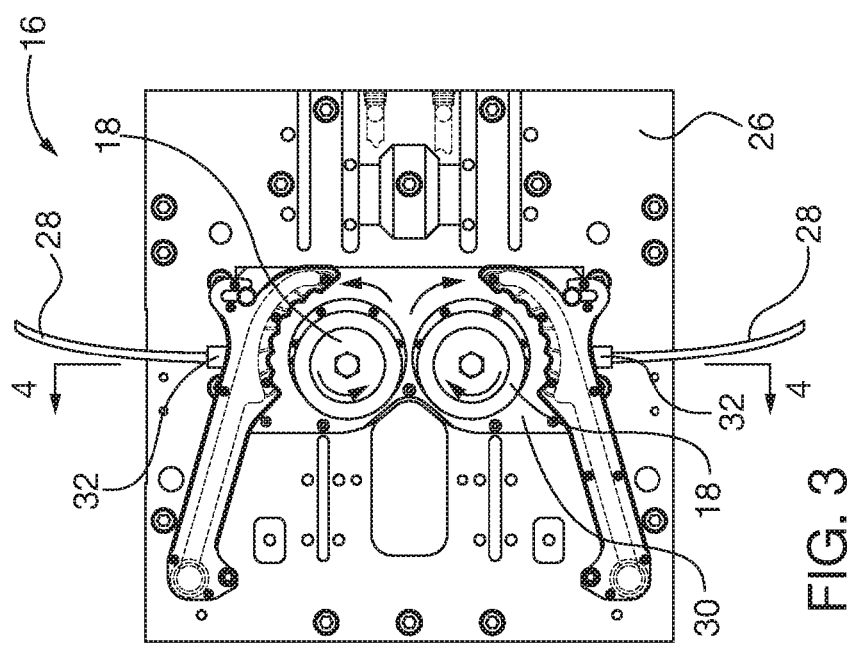
FIG. 3 shows a top plan view of a housing of the metal rod finishing stand of FIG. 1, that includes embodiments of the roll neck seats of the present invention.

Referring to FIGS. 3 and 4, each roll stand 16 includes a housing cover or front plate 26, a pressurized fluid source 28 for biasing the roll neck seals is in communication with a seal plate 30 that circumscribes both work rolls 18. The seal plate 30 is often referred to as a "figure eight plate" due to the pair of aligned holes through which the pair of work rolls 18 projects from the stand 16. Each of the work rolls 18 is coupled to a respective roll shaft 40 that is powered by one of the line shaft segments 20. Each roll shaft 40 has a shaft neck 42 that is aligned axially with the seal plate 30.

Figure 5:
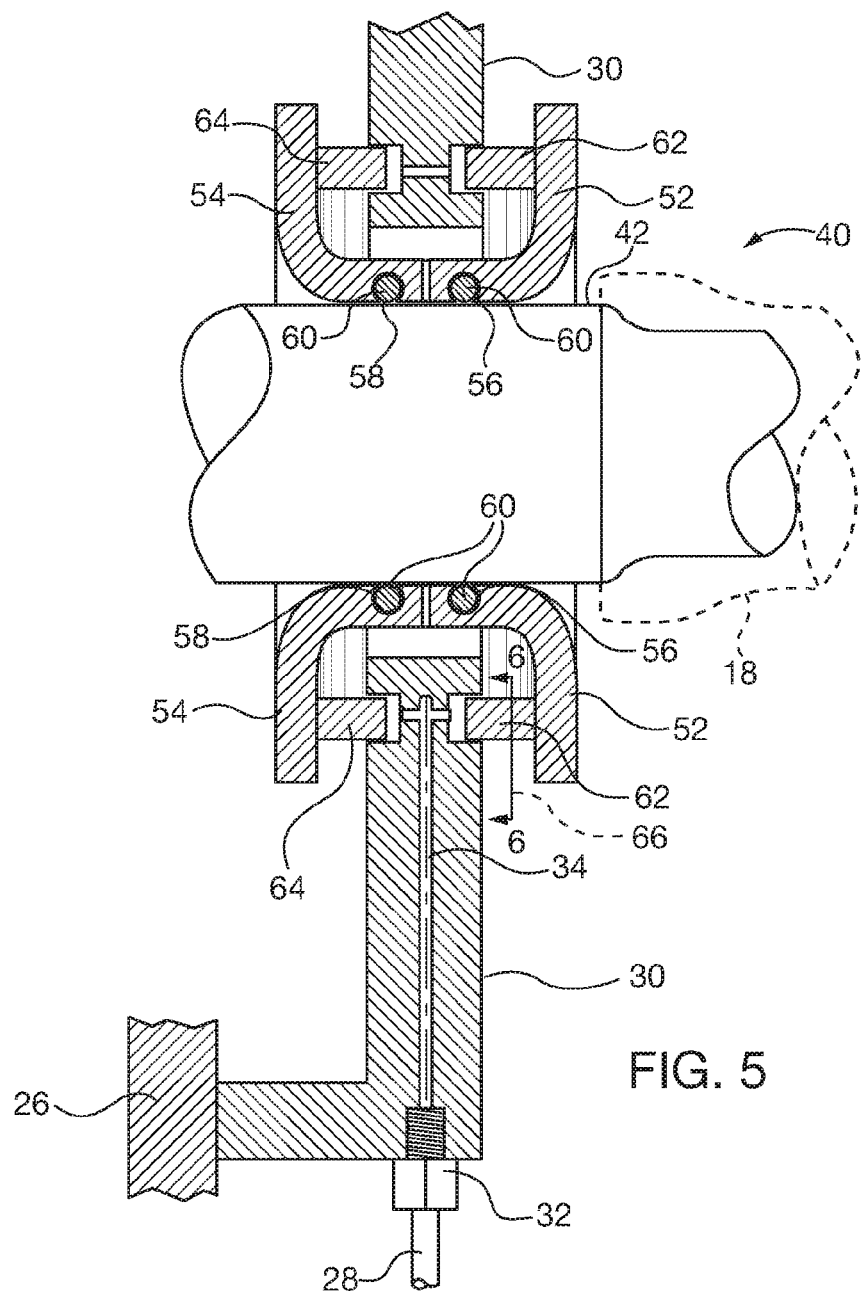
FIG. 5 shows a detailed elevational cross sectional view of an embodiment of a roll neck seal of the present invention.
Figure 6:
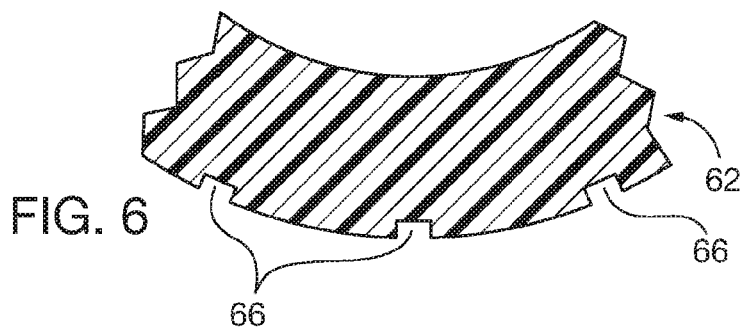
FIG. 6 is an axial cross sectional view of an embodiment of a roll neck seal present invention.

The seal apparatus components are shown in greater detail in FIGS. 5-7. The seal plate 30 has a fitting 32 that is coupled to the pressurized fluid source 28. The fitting 32 is in communication with a passage 34 and annular cavity formed on both sides of the seal plate axial surfaces, circumscribing the roll shaft 40 and its shaft neck 42. In the roll stand embodiment of FIG. 4 with pair of cantilevered roll shafts 40, each of the portions of the figure eight seal plate 30 that circumscribes each respective roll shaft neck 42 has a pressurized fluid communicating cavity 36, passage 34 and fitting 32 that is coupled to the pressurized fluid source, (e.g., compressed air), but alternatively each seal apparatus may be fed pressurized fluid through separate cavities or combinations of shared cavities.

The roll neck sealing apparatus also has a pair of annular bushing flingers 52, 54 that circumscribe the roll neck 42 and are intended to rotate with the roll 40. The annular gap between the shaft neck 42 outer diameter and the respective flingers 52, 54 inner diameters is sealed by the pair of O-rings 60 that are radially and axially retained within a slot defined by each respective flinger inner diameter. The flingers 52, 54 have opposed axial surfaces that are also axially spaced in opposing relationship with respective axial surfaces of the seating plate 30. A pair of generally annular ring seals 62, 64 is retained in each respective seal plate cavity 36 that is defined on each axial surface of the seat plate 30, thus circumscribing the roll 40/roll neck 42. The ring seals 62, 64 have respective first axial seal faces that are in axial contact with a corresponding flinger 52, 52 axial surfaces. Thus axial and radial dimensions of the annular gap between the respective flingers 52, 54 and the seal plate 30 are effectively sealed by the respective ring seals 62, 64. The ring seals 62, 64 are constructed of resilient material, such as elastomeric material, that flexes to accommodate localized variations in the axial and/or radial gap between the roll 40 and the seal plate 30 caused by varying loads on the work rolls 18. Pressurized fluid in the respective plate cavities 36 acting on the second axial face of each of the respective ring seals 62, 64 biases each of the ring seals in an axially outwardly direction toward its corresponding flinger axial surface. As the respective ring seals 62, 64 inevitably wear from contact with their corresponding rotating flingers 52, 54 the pressurized fluid in cavity 36 maintains axial pressure between the seals and flingers.

The ring seals 62, 64 can be constructed with axially oriented passages for positive pressure bleeding of pressurized fluid from within the sealing plate 30 to the environmental zones outside the neck sealing apparatus, for isolation of the roll stand 16 interior from its external environment in the rolling mill. One type of exemplary axial bleed passage is formation of axial flutes 66 about the external housing side ring seal 62 outer diameter. The positive pressure bleeding reduces likelihood that cooling water (as well as debris generated during metal rolling) will infiltrate the stand 16.

While the exemplary embodiments shown herein have a stationary sealing plate 30 with pressurized fluid cavities 36 for biasing the ring seals 62, 64 axially against a pair of flanking flingers 52, 54, other sealing geometries incorporating pressure biased seals may be utilized when practicing the present invention. For example, a single rotating flinger with a pair of opposed axial faces may be axially flanked by a pair of spaced stationary seal plates with pressurized cavities that bias the ring seals axially inwardly toward the flinger axial surfaces. Alternatively when practicing the present invention a single flinger/ring seal/seating, plate apparatus may be substituted for the pairs of ring seals.

Although various embodiments that incorporate the teachings of the present invention have been shown and described in detail herein, those skilled in the art can readily devise many other varied embodiments that still incorporate these teachings. Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified limited otherwise, the terms "mounted" "connected," "supported" and "coupled" and variations thereof are used broadly and encompass direct and indirect mountings, connections, supports, and couplings. Further, "connected" and "coupled" are not restricted to physical or mechanical connections or couplings.

What is claimed is:

1. A seal assembly for a rotatable shaft, said seal assembly comprising:
   a seal end plate circumscribing said shaft;
   a pair of radially projecting circular flingers mounted on said shaft for rotation therewith, said flingers being arranged to straddle said seal end plate and having interior sealing surfaces spaced axially from respective oppositely facing sides of said seal end plate;

circular grooves in the oppositely facing sides of said seal end plate;

ring seals captured in and projecting axially from said grooves;

a network of first passages in said seal end plate, said first passage being configured and arranged to deliver a pressurized fluid to said circular grooves to thereby bias said ring seals axially into contact with the interior sealing surfaces of said flingers, said ring seals having axially oriented second passages for bleeding said pressurized fluid from within said seal end plate to environmental zones outside of said seal assembly, wherein said second passages comprise axial flutes in external surfaces of said ring seals.

2. The seal assembly of claim 1 wherein said pressurized fluid is compressed air.

\* \* \* \* \*